(12) United States Patent
Takeshita et al.

(10) Patent No.: US 10,144,308 B2
(45) Date of Patent: Dec. 4, 2018

(54) ELECTRIC EQUIPMENT UNIT AND VEHICLE

(71) Applicant: TOYOTA JIDOSHA KABUSHIKI KAISHA, Toyota-shi, Aichi-ken (JP)

(72) Inventors: Masahiro Takeshita, Toyota (JP); Shigetaka Yoshikawa, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 267 days.

(21) Appl. No.: 14/932,177

(22) Filed: Nov. 4, 2015

(65) Prior Publication Data

US 2016/0137099 A1 May 19, 2016

(30) Foreign Application Priority Data

Nov. 13, 2014 (JP) .................. 2014-230765

(51) Int. Cl.
*B60L 11/18* (2006.01)
*B60L 3/00* (2006.01)

(52) U.S. Cl.
CPC ......... *B60L 11/1896* (2013.01); *B60L 3/0053* (2013.01); *Y02T 90/34* (2013.01)

(58) Field of Classification Search
CPC ............... B60L 11/1896; B60L 3/0053; Y02T 10/7005; Y02T 10/7241
See application file for complete search history.

(56) References Cited

U.S. PATENT DOCUMENTS

| 2,453,980 A | * | 11/1948 | Hartman | ................... F16L 3/13 248/68.1 |
| 6,460,642 B1 | | 10/2002 | Hirano | |
| 2002/0187376 A1 | | 12/2002 | Nishiumi | |
| 2012/0006607 A1 | | 1/2012 | Ohashi | |
| 2013/0187449 A1 | * | 7/2013 | Mouri | ................. B60L 11/1881 307/10.1 |

(Continued)

FOREIGN PATENT DOCUMENTS

JP 2000-152470 A 5/2000
JP 2002-367666 12/2002

(Continued)

*Primary Examiner* — Jared Fureman
*Assistant Examiner* — Emmanuel R Dominique
(74) *Attorney, Agent, or Firm* — Finnegan, Henderson, Farabow, Garrett & Dunner, LLP

(57) ABSTRACT

To prevent that a connecting portion of a cable with an electrical equipment disposed rearward of the cable, an electrical equipment unit to be mounted on a vehicle is provided. The electrical equipment unit includes an inverter for supplying electric power to a drive motor of the vehicle, a fuel cell module disposed rearward of the inverter in longitudinal directions of the vehicle, a cable connecting the inverter with the fuel cell module, and a first clamp attached to the vehicle and for holding the cable. The first clamp has a gripping part formed with an opening and for gripping the cable, and an opening formed in part of the gripping part to extend in axial directions of the cable. The opening is formed in part of the gripping part to extend over one side of the gripping part in axial directions of the cable so as to receive the cable The opening is formed on a rear side in the gripping part in longitudinal directions of the vehicle.

4 Claims, 6 Drawing Sheets

(56) References Cited

U.S. PATENT DOCUMENTS

2015/0136479 A1\* 5/2015 Oga ................... B60R 16/0215
174/72 A

FOREIGN PATENT DOCUMENTS

| JP | 2006-353062 | 12/2006 |
| JP | 2007-141636 | 6/2007 |
| JP | 2010-251182 | 11/2010 |
| JP | 2013-107448 | 6/2013 |
| JP | 2013-247818 A | 12/2013 |
| WO | WO 2013/180251 A1 | 12/2013 |

\* cited by examiner

ELECTRIC EQUIPMENT UNIT AND VEHICLE

CROSS REFERENCE TO RELATED APPLICATION

This application claims priority based on Japanese Patent Application No. 2014-230765, filed on Nov. 13, 2014, the contents of all of which are incorporated herein by reference in their entirety.

BACKGROUND OF THE INVENTION

The present invention relates to an electric equipment unit and a vehicle on which the electric equipment unit is mounted.

Generally, vehicles on which a fuel cell is mounted carry a plurality kinds of electrical equipment. The plurality kinds of electrical equipment include an inverter which is connected with a drive motor provided in a front part of the vehicle, and a fuel cell module which is disposed underfloor of the vehicle. These kinds of electrical equipment are connected with each other by a cable. For example, JP2010-251182A discloses such a structure.

In the conventional art, when a frontal collision of the vehicle occurs, stress produced from the collision is transmitted through the cable and causes an impact on the connecting portion of the cable with the fuel cell module which is disposed rearward of the cable. Therefore, there is a possibility of damaging this connecting portion of the cable with the fuel cell module which is disposed rearward of the cable (hereinafter, may simply be referred to as the "cable connecting portion"). Note that a similar issue may arise also in a case where a rear collision of the vehicle occurs.

SUMMARY OF THE INVENTION

The present invention is made in order to solve at least a part of the subject described above, and can be implemented in view of the following aspects.

(1) According to one aspect of the invention, an electrical equipment unit to be mounted on a vehicle is provided. The electrical equipment unit includes an inverter for supplying electric power to a drive motor of the vehicle, a fuel cell module disposed rearward of the inverter in longitudinal directions of the vehicle, a cable connecting the inverter with the fuel cell module, and a first clamp attached to the vehicle and for holding the cable. The first clamp has a gripping part for gripping the cable, and an opening formed in part of the gripping part to extend in axial directions of the cable. The opening is formed on a rear side in the gripping part in longitudinal directions of the vehicle. According to this electrical equipment unit, when a load is applied to the cable from one of the longitudinal directions of the vehicle due to a collision etc., the cable is removed from the opening of the first clamp. Therefore, the cable can be released from the restraint of the first clamp and escape into an internal space between the inverter and the fuel cell module. Thus, according to this electrical equipment unit, when a frontal/rear collision occurs, stress that acts on a connecting portion of the cable with an electrical equipment provided in the fuel cell module can be reduced, and the cable connecting portion can be prevented from being damaged.

(2) In the electrical equipment unit of the aspect described above, between the inverter and the fuel cell module, the cable may have a portion inclining with respect to the longitudinal directions of the vehicle. The first clamp may hold the cable at the inclining portion. According to this structure, the cable can be released from the opening of the first clamp more easily.

(3) In the electrical equipment unit of the aspect described above, the cable may have a first segment cable connected with the inverter, a second segment cable connected with the fuel cell module, and a connector connecting the first segment cable with the second segment cable. The first clamp may hold the first segment cable. The cable is preferably dividable for the sake of convenience in assembling the vehicle, and in this case, a connector for connecting the segment cables is required. According to this electrical equipment unit, the first clamp is attached to the first segment cable that is on the inverter side with respect to the connector. Since the cable is released from the restraint of the first clamp when the frontal/rear collision occurs as described above, stress that acts on the connector can be reduced, and the connector can be prevented from being damaged.

(4) The electrical equipment unit of the aspect described above may also include a second clamp for holding the connector. A fracture strength of the second clamp may be lower than that of the connector. According to this structure, the second clamp is broken by the stress before an excessive stress is produced against the connector. Thus, the connector moves flexibly and is not damaged even if it receives the load.

(5) In the electrical equipment unit of the aspect described above, the fuel cell module may include a fuel cell stack, and a converter for converting a voltage of the power generated by the fuel cell stack. According to this structure, in the fuel cell vehicle, the stress on the cable connecting portion with the fuel cell module can be reduced.

(6) According to another aspect of the invention, a vehicle on which the electrical equipment unit of the above aspect is mounted is provided. The vehicle of this aspect can reduce the stress that acts on the connecting portion of the cable with the electrical equipments provided in the fuel cell module can be reduced, and prevent the cable connecting portion from being damaged, similarly to the electrical equipment unit of the above aspect.

BRIEF DESCRIPTION OF THE DRAWINGS

The present disclosure is illustrated by way of example and not by way of limitation in the figures of the accompanying drawings in which.

Next, an embodiment of the present invention is described.

DETAILED DESCRIPTION OF EMBODIMENT

A. Overall Structure

Figure 1:
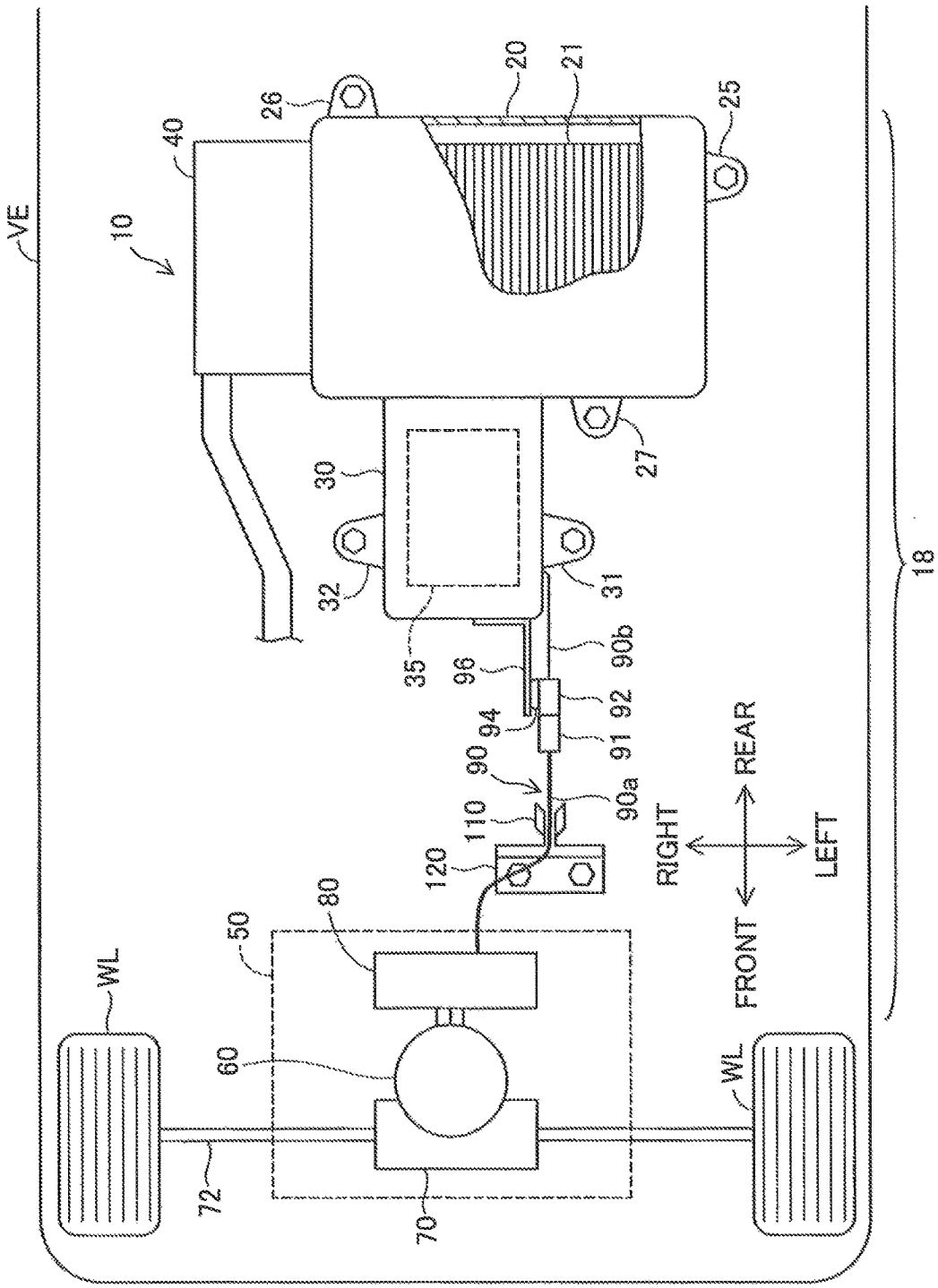
FIG. 1 is a view illustrating a structure of a fuel cell vehicle as one embodiment of the present invention.

FIG. 1 is a view illustrating a structure of a fuel cell vehicle as one embodiment of the present invention. The fuel cell vehicle (hereinafter, simply referred to as the "vehicle") VE is an automobile including wheels WL at four corners, respectively. A fuel cell system 10 is arranged underfloor of the vehicle VE, near a center in longitudinal directions of the vehicle VE. An engine compartment 50 is provided at a front part of the vehicle VE. In FIG. 1, the arrows with "front," "rear," "left" and "right" and the arrows with "up" and "down" in the other drawings indicate directions defined with respect to the vehicle VE. In other words, directions along the arrows "front" and "rear" correspond to longitudinal directions of the vehicle VE, directions along the arrows "left" and "right" correspond to lateral directions of the vehicle VE, and directions along the arrows "up" and "down" correspond to vertical directions of the vehicle VE. Hereinafter, the phrases "forward," "rearward," "rightward," "leftward," "upward" and "downward" mean directions indicated by the arrows "front," "rear," "left," "right," "up" and "down" illustrated in the drawings, respectively. The phrase "engine compartment" used for a conventional engine vehicle generally means a space where an engine is mounted. Also in the vehicle VE, a space where a drive motor 60 which is a drive source is mounted, is referred to as the "engine compartment."

The fuel cell system 10 includes a stack case 20 which accommodates a fuel cell (hereinafter, may also be referred to as the "FC") stack 21, a converter case 30 which accommodates an FC converter 35, and an auxiliary cover 40 which accommodates a fluid supplying and discharging unit (not illustrated).

As illustrated with a part exposed, the stack case 20 accommodates the fuel cell stack 21. The fuel cell stack 21 is a cell stacked body in which a plurality of unit cells (power generation cell) of the fuel cell are stacked, for example, a cell stacked body in which a plurality of power generation cells of a polymer electrolyte fuel cell are stacked. Each of the power generation cells generates power by using fuel gas which is supplied from a fuel gas tank (not illustrated) mounted on the vehicle VE, and air which is supplied as oxidizing gas from around the fuel cell vehicle. In this embodiment, hydrogen gas is adopted as the fuel gas.

The FC converter 35 accommodated inside the converter case 30 is a voltage converter (DC-DC converter) which boosts power which is supplied from the fuel cell stack 21. The power boosted by the FC converter 35 is sent inside the engine compartment 50. A structure including the fuel cell stack 21 and the FC converter 35 corresponds to a subordinate concept of "fuel cell module".

The fluid supplying and discharging unit accommodated inside the auxiliary cover 40 includes various kinds of piping for fuel gas, oxidizing gas, cooling medium, etc., and actuators of a pump, an injector, etc. which communicate with the various kinds of piping.

The stack case 20 is transversely placed so that stacking directions of the plurality of power generation cells of the fuel cell stack 21 are substantially in agreement with the lateral directions of the vehicle VE (vehicle width directions). The converter case 30 is coupled to the stack case 20 at the front of the stack case 20, and the auxiliary cover 40 is coupled to the stack case 20 on the right side of the stack case 20. The stack case 20 and the converter case 30 are fixed onto a chassis (vehicle frame, not illustrated). The stack case 20 is fixed by three mounts 25, 26 and 27. The converter case 30 is fixed by two mounts 31 and 32. Note that the stack case 20, the converter case 30, and the auxiliary cover 40 are formed by casting metal (e.g., aluminum).

The engine compartment 50 accommodates, in addition to the drive motor 60, gears 70 which transmit, to the wheels WL via an axle 72, a torque generated by the drive motor 60, an inverter 80 which is connected with the drive motor 60, etc.

The inverter 80 and the FC converter 35 which is inside the converter case 30 are coupled to each other by as cable 90. The cable 90 is a bundle of cables, and may also be referred to as a wire harness. The inverter 80 receives, through the cable 90, a direct current boosted by the FC converter 35, converts it into a three-phase alternating current, and supplies it to the drive motor 60. A rotational speed of the drive motor 60 is controlled by the inverter 80.

B. Peripheral Structure of Cable

Figure 2:
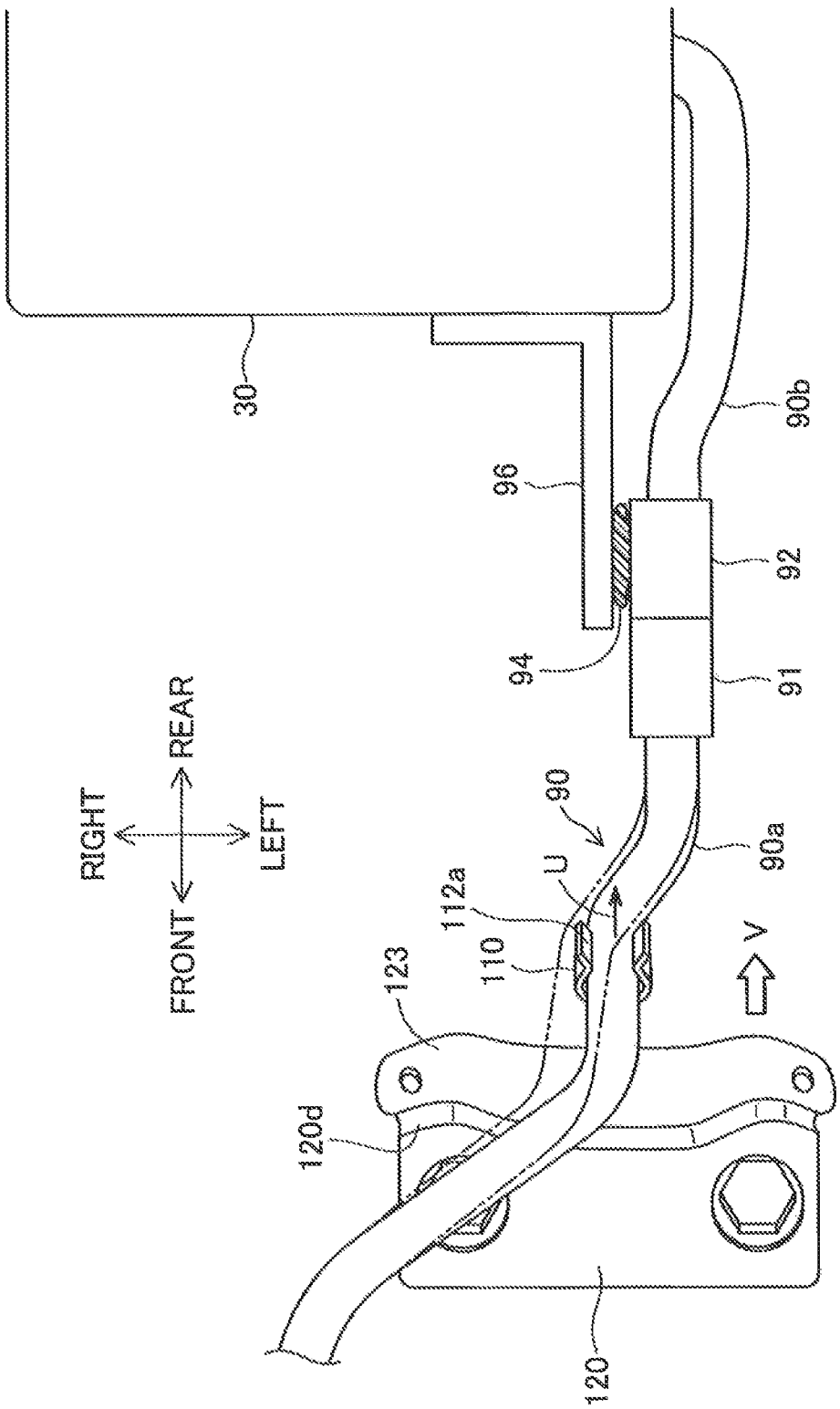
FIG. 2 is a plan view illustrating a cable and a peripheral structure thereof.
Figure 3:
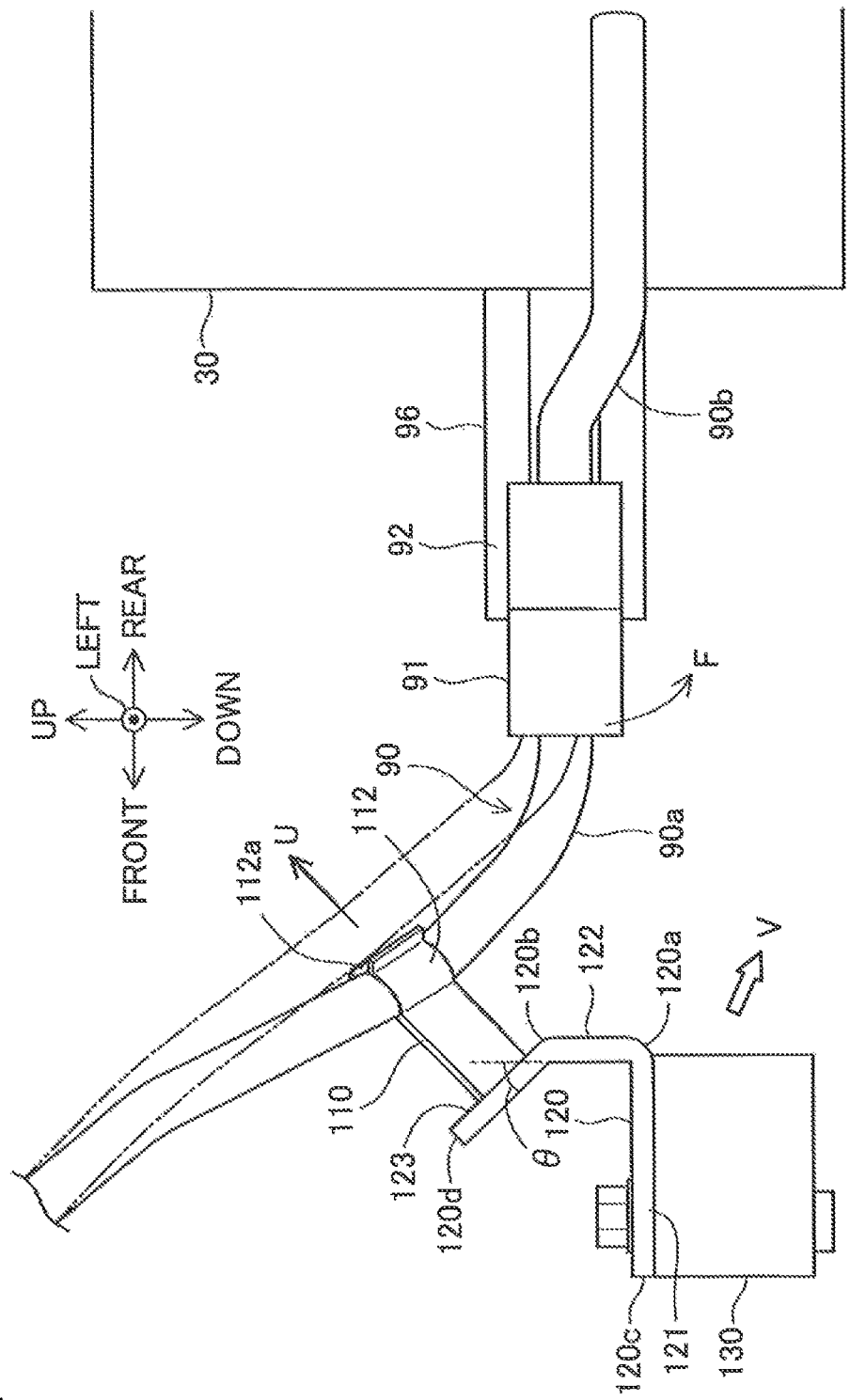
FIG. 3 is a side view illustrating the cable and the peripheral structure thereof.

FIG. 2 is a plan view illustrating the cable 90 and a peripheral structure thereof. FIG. 3 is a side view illustrating the cable 90 and the peripheral structure thereof. The cable 90 is constituted by a first segment cable 90a of which one end is connected with the inverter 80 (FIG. 1), and a second segment cable 90b of which one end is connected with the FC converter 35 which is inside the converter case 30. The cable 90 is constituted by the first and second segment cables 90a and 90b because the cable 90 needs to be dividable for the sake of convenience in assembling the vehicle. The first segment cable 90a is coupled to the second segment cable 90b by a pair of connectors 91 and 92. The connector 92 connected with the second segment cable 90b is fixed to a bracket 96 via a mushroom-shaped clamp 94. The mushroom-shaped clamp 94 has an axial part of which base portion is attached to a fixing target structural object (here, connector 92), and a head part provided at a tip portion of the axial part and formed thicker than the axial part in the longitudinal directions. The mushroom-shaped clamp 94 is pushed through a hole formed in a different plate-like structural object (here, bracket 96) when in use. The hole is formed thicker than the axial part but thinner than the head part. The mushroom-shaped clamp 94 holds the plate-like structural object between the base portion, which is formed thicker than the other portion of the axial part in the longitudinal directions, and the head part to fix the fixing target structural object (here, connector 92) to the plate-like structural object (here, bracket 96). The bracket 96 is fixed to the converter case 30. Note that the mushroom-shaped clamp 94 may have a different shape.

The bracket 96 is a fixture to hold the connector 92 at a predetermined position, and has an L-shaped cross section. The bracket 96 is made by forming a galvanized steel plate. The mushroom-shaped clamp 94 is made of resin, such as polypropylene (PP). In this embodiment, a fracture strength of the mushroom-shaped clamp 94 is lower than that of the connectors 91 and 92. When the first segment cable 90a receives the force including the backward component in longitudinal directions of the vehicle, the connection of the connector 92 and the bracket 96 by the mushroom-shaped clamp 94 is released before the connection of the connectors 91 and 92 is released. Specifically, a resin material with a lower fracture strength than that of a resin material used for resin portions of the connectors 91 and 92 is used for the mushroom-shaped clamp 94. Note that here, the high and low of the fracture strength s of the materials are determined by comparing stress of fracturing test pieces which are made of the respective materials and having the same shape, when tensile stress is applied thereto.

By joining the connector 91 connected with the first segment cable 90a, with the connector 92 fixed to the bracket 96, the first segment cable 90a is coupled to the second segment cable 90b. A C-shaped clamp 110 is attached to an intermediate portion of the first segment cable 90a. Specifically the C-shaped clamp 110 is attached to a position of the cable 90 on the side of the inverter 80 with respect to the connectors 91 and 92. More specifically, the first segment cable 90a partially inclines with respect to the longitudinal directions of the vehicle VE. In this embodiment, in the inclining part of the segment cable 90a, the C-shaped clamp 110 is attached to a portion only inclining downward while extending substantially straight in the lateral directions. Note that instead of the portion only inclining downward, the C-shaped clamp 110 may be attached to a portion inclining in any of other directions.

Figure 4:
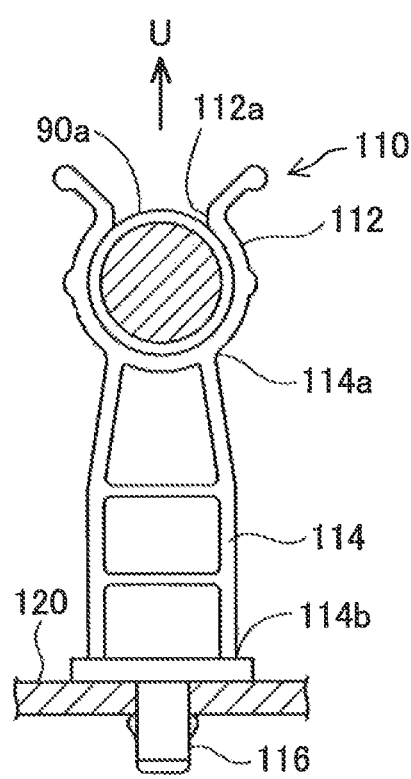
FIG. 4 is an elevational view of a C-shaped clamp.

FIG. 4 is an elevational view of the C-shaped clamp 110. As illustrated, the C-shaped clamp 110 includes a gripping part 112, a supporting part 114, and an attaching part 116. The gripping part 112 is a substantially circular-cylindrical portion having an opening 112a in part thereof in its circumferential directions over axial directions thereof, and has a C-shaped cross section. When the C-shaped clamp is attached to the first segment cable 90a, the axial directions described above are in agreement with axial directions of the first segment cable 90a. A facing direction U of the opening 112a is the upper direction in FIG. 4. By pushing the first segment cable 90a from the upper direction in FIG. 4 to elastically stretch the opening 112a wider, the C-shaped clamp 110 can grip the first segment cable 90a at the C-shaped gripping part 112. The supporting part 114 is a thin member having a first end portion 114a and a second end portion 114b, and extending in the U-direction. The first end portion 114a is coupled to a face of the gripping part 112 opposite from the opening 112a. The second end portion 114b is coupled to the attaching part 116. The attaching part 116 extends away from the first end portion 114a to be fitted into a hole of a coupling part 120 disposed near the engine compartment 50. Thus, the C-shaped clamp 110 stands from an attaching surface of the coupling part 120.

As illustrated in FIG. 3, the coupling part 120 is formed by bending a plate-like base material by 90° at a first bending position 120a, and further bending it by a predetermined angle θ which is below 90° (e.g., 45°) at a second bending position 120b. An outer (lower) surface extending from an end 120c of the coupling part 120 to the first bending position 120a is a first surface 121, an outer (rear) surface extending from the first bending position 120a to the second bending position 120b is a second surface 122, and an outer (upper) surface extending from the second bending position 120b to the other end 120d of the coupling part 120 is a third surface 123. A base member 130 is fixed to the first surface 121, and the C-shaped clamp 110 stands from the third surface 123 (the attaching surface described above). The mounted components such as the drive motor 60, the inverter 80, etc. which are inside the engine compartment 50 are fixed to the chassis by mount parts (not illustrated). Similarly, the base member 130 is also fixed to the chassis by a mount part. Thus, the C-shaped clamp 110 is fixed to the chassis.

On the chassis, the base member 130 is arranged so that the second surface 122 of the coupling part 120 faces rearward. In this embodiment, the base member 130 is fixed to the chassis so that the second surface 122 extends in the lateral and vertical directions of the vehicle and faces rearward. As a result, the C-shaped clamp 110 standing from the third surface 123 of the coupling part 120 is arranged to face rearward (rearward and upward, to be exact) of the vehicle VE. Moreover, the C-shaped clamp 110 is arranged so that the facing direction of the opening 112a (U-direction) is oriented rearward and upward. In this embodiment, the phrase "rearward and upward" means a direction which is 45° inclined upward with respect to the rear direction in a side view along the lateral directions. Note that in a plan view along the vertical directions, as illustrated in FIG. 2, the facing direction U of the opening 112a is the rear direction with no leftward/rightward inclination therefrom.

As described above, the part of the cable 90 held by the C-shaped clamp 110 is part of the first segment cable 90a inclining downward with respect to the longitudinal directions of the vehicle VE, and the facing direction of the opening 112a of the C-shaped clamp 110 is oriented rearward and upward. Therefore, the C-shaped clamp 110 can easily grip the inclining portion of the first segment cable 90a.

The C-shaped clamp 110 corresponds to a subordinate concept of "first clamp." The mushroom-shaped clamp 94 corresponds to a subordinate concept of "second clamp." Note that a structure including the inverter 80, the fuel cell stack 21, the FC converter 35 which is inside the converter case 30, and the respective components 20, 90, 110 etc. described in the section of "B. Peripheral Structure of Cable" corresponds to a subordinate concept of the electrical equipment unit of one embodiment of the present invention.

C. About Collision

A case where a frontal collision of the vehicle VE configured as above occurs is described next. When the vehicle VE collides from the front with a different object, the drive motor 60, the inverter 80 and the like which are inside the engine compartment 50 receive a load from the front and move rearward and downward. Accordingly, the mount parts (not illustrated) attaching the drive motor 60, the inverter 80 and the like also move rearward and downward, and the base member 130 also moves in the direction indicated by the arrow V in the plan view of FIG. 2 and the side view of FIG. 3, in other words, rearward and downward. Further, due to the rearward and downward movement of the inverter 80 and the like, a load is applied to the first segment cable 90a from the front. Thus, the first segment cable 90a deforms as indicated by the two-dotted chain line in FIGS. 2 and 3 to move rearward. The first segment cable 90a first moves integrally with the C-shaped clamp 110, then slides through the gripping part 112 of the C-shaped clamp 110, and finally, the first segment cable 90a slips out from the opening 112a of the gripping part 112. As a result, the first segment cable 90a is removed from the C-shaped clamp 110.

If the first segment cable 90a further receives a load after being removed from the C-shaped clamp 110, a force is produced to push the first segment cable 90a rearward and downward and remove the pair of connectors 91 and 92 from the bracket 96. Specifically, as illustrated in the side view of FIG. 3, a rotational force F acts on the connector 92 fixed to the mushroom-shaped clamp 94, so that a front part of the connector 92 shifts downward by having the lateral directions as a rotational axis. Note that here, as illustrated in the plan view of FIG. 2, the connector 92 does not greatly rotate in the lateral directions.

Figure 5:
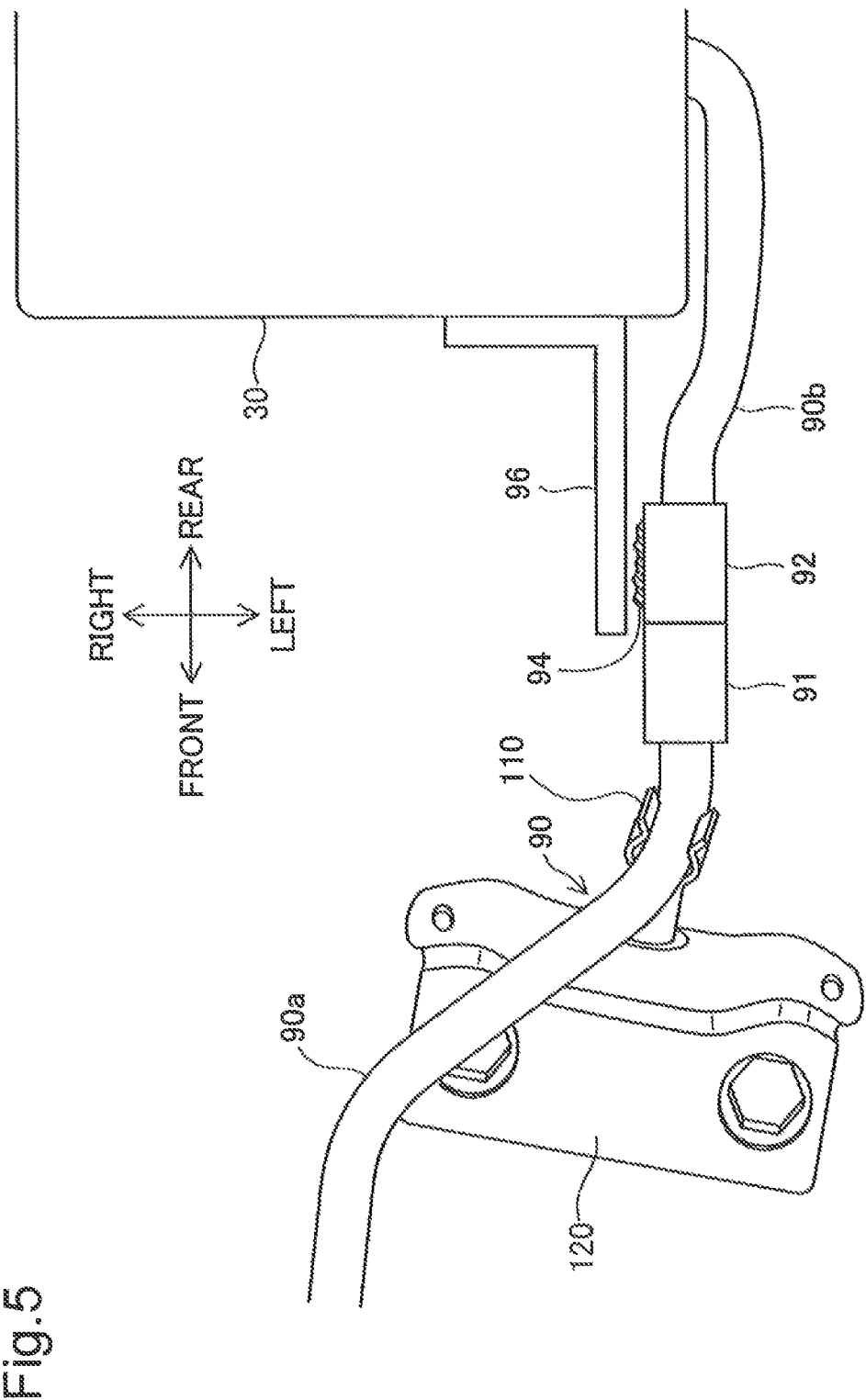
FIG. 5 is a plan view illustrating the cable and the peripheral structure thereof after a collision.
Figure 6:
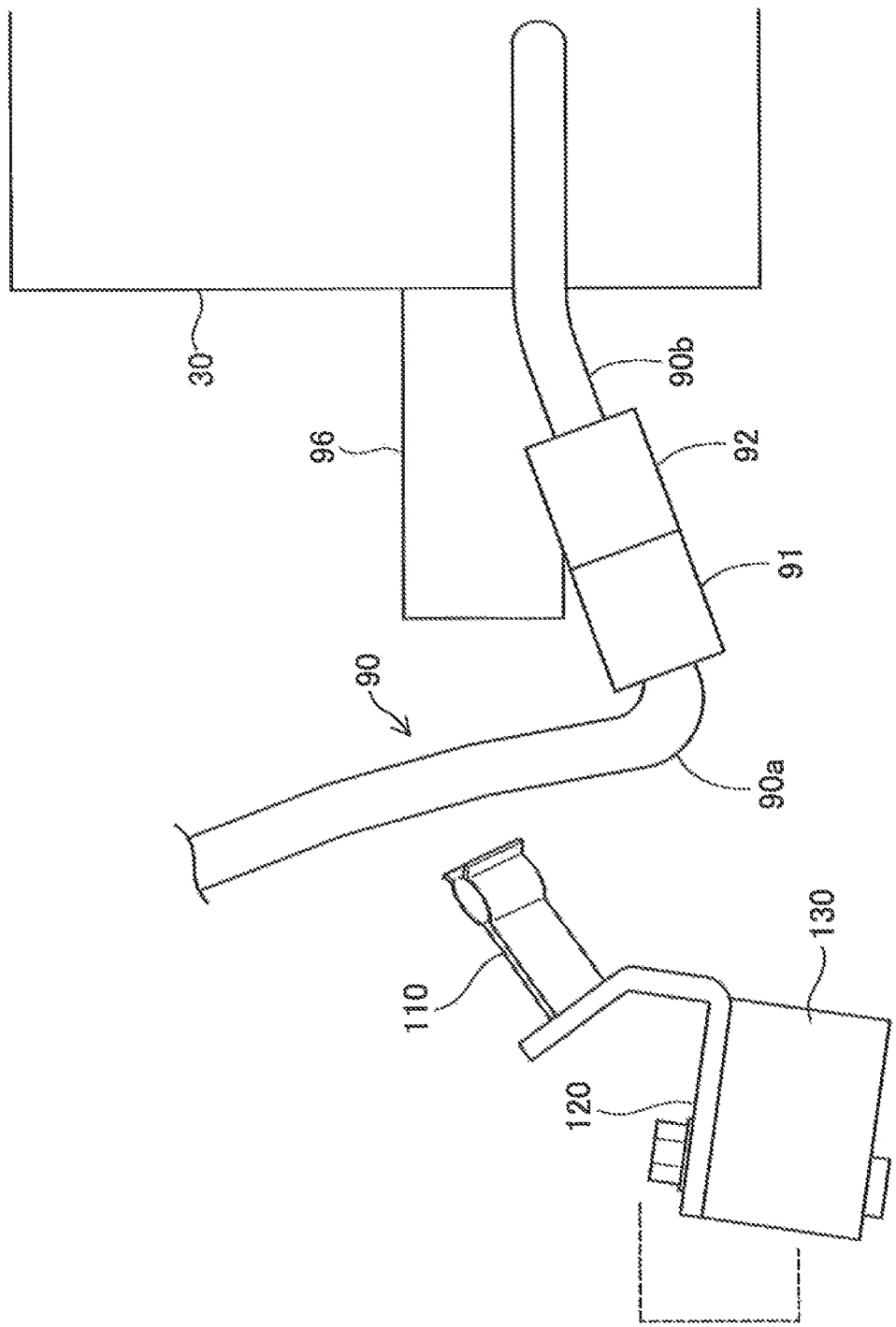
FIG. 6 is a side view illustrating the cable and the peripheral structure thereof after the collision.

FIG. 5 is a plan view illustrating the cable 90 and the peripheral structure thereof after the collision. FIG. 6 is a side view illustrating the cable 90 and the peripheral structure thereof after the collision. After the frontal collision of the vehicle VE occurs, the pair of connectors 91 and 92 are removed from the bracket 96 by the force F described above. The pair of connectors 91 and 92 are removed from the bracket 96 by rupturing the mushroom-shaped clamp 94. As described above, the strength of the mushroom-shaped clamp 94 is lower than that of the connectors 91 and 92. Therefore, the mushroom-shaped clamp 94 is first ruptured and the connectors 91 and 92 are not damaged. If a load is further applied to the cable 90, the cable 90 pushes the pair of connectors 91 and 92 further downward. As a result, the pair of connectors 91 and 92 move greatly rearward and downward from the state of FIG. 3, and settle at a position illustrated in FIG. 6. This position is within a space which still remains after the collision, and therefore, the pair of connectors 91 and 92 are not damaged.

As described above, with the vehicle VE of the first embodiment, the connectors 91 and 92 of the cable 90 coupling the inverter 80 to the FC converter 35 which is inside the converter case 30 can be prevented from being damaged when the vehicle VE collides from the front with a different object. Further, a damage on a connecting portion of the cable 90 with the FC converter 35 can also be prevented. Furthermore, since the connectors 91 and 92 are not damaged, a high voltage leakage from the converter can be prevented when the collision occurs. Note that also when the vehicle VE collides from the rear, the cable 90 is similarly removed from the C-shaped clamp 110. Thus, similar effects to the frontal collision can be obtained.

D. Modifications

First Modification

In the above embodiment, the mushroom-shaped clamp 94 is structured to have the lower fracture strength than the connectors 91 and 92. However, the fracture strength of the mushroom-shaped clamp 94 may alternatively be equivalent to that of the connectors 91 and 92.

The mushroom-shaped clamp holding the structural object such as the connector is not limited to have the mushroom shape, and may be a different kind of clamp, such as a clamp having an opening on one side and for surrounding a target object with other part and holding it. Further, the electrical equipment unit may not be provided with the clamp holding the connector.

In the above embodiment, the cable 90 has the portion inclining with respect to the longitudinal directions of the vehicle and is held by the clamp at the inclining portion. However, the cable may not have the portion inclining with respect to the longitudinal directions of the vehicle. In this case, the cable may be held by the clamp at a portion extending in the longitudinal directions.

In the above embodiment, the first segment cable 90a of the cable 90 is gripped by the C-shaped clamp 110. However, the clamp may grip the second segment cable 90b instead of the first segment cable 90a. Further, the cable may have an unsegmented structure, in other words, a structure which does not require a connector.

Second Modification

In the above embodiment, the C-shaped clamp 110 is structured so that the facing direction U of the opening 112a is a direction inclining by 45° upward with respect to the rear direction in the side view along the lateral directions and is the rear direction with no leftward/rightward inclination therefrom in the plan view along the vertical directions. Alternatively, the facing direction U of the C-shaped clamp 110 may be any of the directions described in the following (1) to (3).

(1) The direction having an upward inclination with respect to the rear direction by any angle above 0° and below 90° but except for 45° in the side view along the lateral directions, and being the same as the above embodiment in the plan view along the vertical directions.

(2) The direction same as the above embodiment in the side view along the lateral directions, and having an inclination in one of the lateral directions by any angle above 0° and below 90° in the plan view along the vertical directions.

(3) The direction having an upward inclination with respect to the rear direction by any angle above 0° and below 90° but except for 45° in the side view along the lateral directions, and having an inclination in one of the lateral directions by any angle above 0° and below 90° in the plan view along the vertical directions.

In the above embodiment and the directions described in (1) to (3), the facing direction of the opening is rearward of a first plane extending in the vertical and lateral directions at a front end of the gripping part in the longitudinal directions, and upward of a second plane extending in the longitudinal and lateral directions at a lower end of the gripping part in the vertical directions. Since the base member 130 easily moves rearward and downward in the frontal collision, by orienting the facing direction of the opening upward, the cable is easily removed from the opening of the C-shaped clamp. Therefore, the damage on the connector can easily be prevented. Note that, alternative to the above embodiment and the directions described in (1) to (3), the facing direction of the opening may be a direction rearward of the first plane and downward of the second plane.

Third Modification

In the above embodiment and modifications, the polymer eletrolyte fuel cell is adopted as the fuel cell. However, the present invention may be applied to systems for various kinds of fuel cells, such as a phosphoric-acid fuel cell, a molten carbonate fuel cell, and a solid-oxide fuel cell.

Fourth Modification

In the above embodiment and modifications, the FC converter is used as the second electrical equipment disposed rearward of the first electrical equipment. However, a fuel cell stack may be used alternative to the FC converter. Further, a high-voltage electrical equipment other than the FC converter and the fuel cell stack may be used as the second electrical equipment. Furthermore, alternative to the high-voltage electrical equipment, an electrical equipment for any other voltage may be used as the second electrical equipment. Moreover, a high-voltage electrical equipment other than the inverter may be used as the first electrical equipment, or alternatively, an electrical equipment for any other voltage may be used as the first electrical equipment.

Fifth Modification

In the above embodiment and modifications, the present invention is applied to the fuel cell vehicle on which the fuel cell is mounted. However, the present invention may be applied to other electric vehicles such as an electric motor vehicle.

The present invention is not limited to the embodiment and modifications described above, and can be implemented in various structures without departing from the scope of the invention. For example, technical features in the embodiment and modifications corresponding to technical features of each aspect cited in the section of "SUMMARY OF THE INVENTION," can suitably be substituted and/or combined in order to achieve some or all of the subjects described above, or in order to obtain some or all of the effects described above. The elements other than those described in the independent claim are not essential, and can suitably be omitted.

What is claimed is:

1. An electrical equipment unit to be mounted on a vehicle, comprising:
   an inverter that supplies electric power to a drive motor of the vehicle;
   a fuel cell module disposed rearward of the inverter in longitudinal directions of the vehicle;
   a cable that connects the inverter with the fuel cell module; and
   a first clamp that is attached to the vehicle and holds the cable,
   wherein the first clamp has a gripping part for gripping the cable, and an opening formed in part of the gripping part to extend in axial directions of the cable,
   wherein the opening is formed on a rear side in the gripping part in longitudinal directions of the vehicle so that when a load is applied to the cable from one of the longitudinal directions of the vehicle, the cable is removed from the opening of the first clamp,
   wherein the cable comprises
      a first segment cable connected with the inverter,
      a second segment cable connected with the fuel cell module, and
      a connector connecting the first segment cable with the second segment cable,
   wherein the first clamp holds the first segment cable, and
   wherein the electrical equipment unit further comprises a second clamp for holding the connector, wherein a fracture strength of a resin material of the second clamp is lower than that of a resin material of the connector.

2. The electrical equipment unit in accordance with claim 1, wherein between the inverter and the fuel cell module, the cable has a portion inclining with respect to the longitudinal directions of the vehicle, and
   wherein the first clamp holds the cable at the inclining portion.

3. The electrical equipment unit in accordance with claim 1, wherein the fuel cell module includes:
   a fuel cell stack; and
   a converter that converts a voltage of the power generated by the fuel cell stack.

4. A vehicle on which the electrical equipment unit in accordance with claim 1 is mounted.

* * * * *